Dec. 23, 1941.                L. BROWN                2,267,348
                            ANIMAL FEEDER
                         Filed Sept. 9, 1940
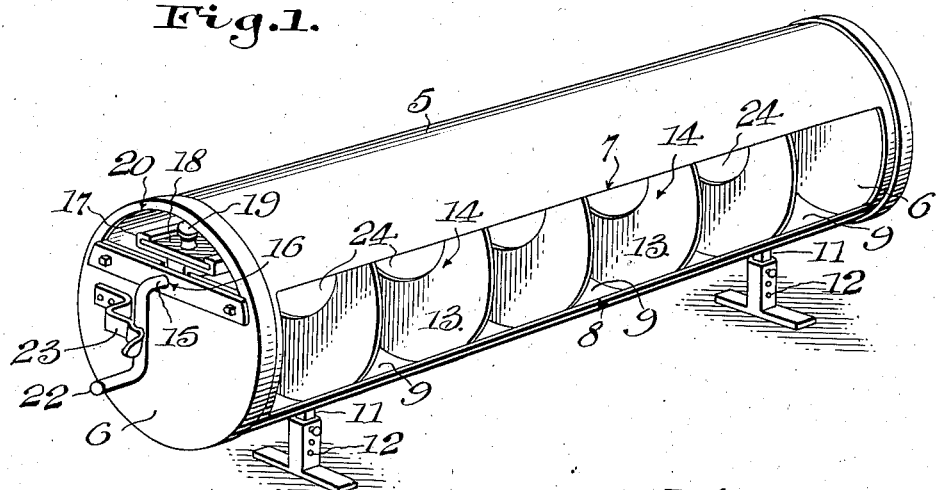
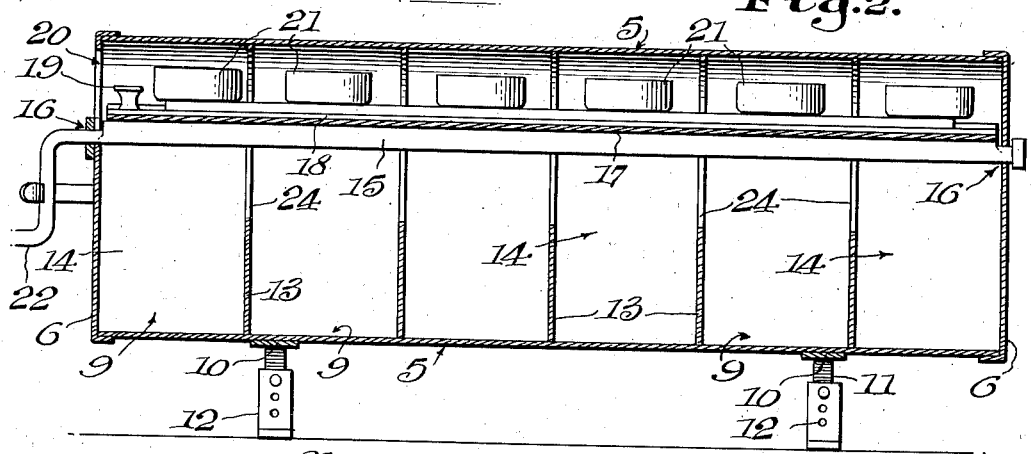
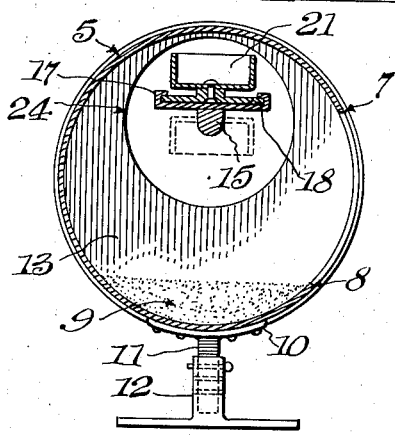
Inventor
Lewis Brown
Attorney Patented Dec. 23, 1941

2,267,348

UNITED STATES PATENT OFFICE 2,267,348

ANIMAL FEEDER

Lewis Brown, Peekskill, N. Y.

Application September 9, 1940, Serial No. 356,079

3 Claims. (Cl. 119—56)

This invention relates generally to animal feeders and primarily seeks to provide a novel, simple and inexpensively constructed feeder which is provided with a multiple of individual feeder compartments or trough portions and which includes novel means by employment of which uniform quantities of feed can be deposited in the respective compartments with great facility.

I am aware that various forms of animal feeders have been provided heretofore, but many of these feeders are found objectionable because of the complicated structure thereof and the cost of manufacture, because the feeder compartments thereof have been improperly sheltered and not readily accessible for both feeding and filling purposes, and because these feeders usually are adapted to use by only certain types of animals. It is the purpose of the present invention to provide an improved animal feeder structure which will avoid all of these objections.

In its more detailed nature the invention resides in the provision of a novel animal feeder structure in which multiple feeder compartments are provided, all sheltered and readily accessible both for feeding and feed replenishing purposes, and in which there is included a novel means in the form of a slide having a feed receiving and measuring receptacle mounted thereon in association with each of the compartments and which can be readily withdrawn from the feeder and filled and thereafter returned to the feeder, and a rotary support for the slide which can be turned to dump the measured individual quantities of feed into the respective compartments after slide has been suitably placed in the feeder.

Another object of the invention is to provide a feeder structure which can be adjusted as to its height above the ground so as to more perfectly adapt it for use by animals of different sizes.

With the above and other objects in view which will more fully appear, the nature of the invention will be more clearly understood by following the description, the appended claims, and the several views illustrated in the accompanying drawing.

In the drawing:

Figure 1 is a perspective view illustrating the improved feeder.

Figure 2 is a central longitudinal section through the feeder.

Figure 3 is a vertical cross section.

In the example of embodiment of the invention herein disclosed the improved feeder includes a cylindrical body 5 closed at its ends by caps or end closure members 6. At one side, near the bottom, the cylindrical body is cut out longitudinally, as at 7, so as to provide an opening through which feeding animals may project their heads into the interior of said body. The lower longitudinal defining edge 8 of the side cut out is disposed high enough so as to provide a feeding trough portion 9 of appreciable depth throughout the length of the feeder body.

Brackets 10 are secured to the bottom of the body 5 and mounting standards 11 depend from these brackets and are vertically-adjustably mounted in supports 12 adapted to rest upon the ground or any other suitable support. It will be obvious that by adjusting the positions of the standards 11 in the mounting sockets 12 the elevation of the feeder above the ground can be adjusted to facilitate the feeding by animals of different sizes.

Partition walls 13 are disposed along the body 5 interiorly thereof and serve to divide the interior of the body into a plurality of individual feeder compartments 14.

A shaft 15 is provided and is disposed with its axis parallel and above the axis of the body 5. This shaft has trunnion bearing at its ends in the end closures 6, as indicated at 16, and carries a slide guide 17 in which a slide 18 is slidably mounted. The slide 18 carries a handle or knob 19 which is accessible through an opening 20 in one end closure 6, and by grasping this handle or knob 19 the slide may readily be withdrawn from or inserted into the guide 17 through the end opening 20.

The slide 18 carries a plurality of equidistantly spaced feed receiving and measuring pans 21, one such pan being disposed over each feed compartment in the manner best illustrated in Figure 2 of the drawing. It will be obvious that by withdrawing the slide 18 through the opening 20 feed in measured quantities can be deposited in the pans 21, and upon again returning the slide to the guide 17 and imparting 180° of movement about its axis to the shaft 15, the measured quantities of feed will be dumped from the pans 21 into the respective compartments.

Turning of the shaft 15 is facilitated by provision of a crank 22 at one end thereof, and a yieldable retainer clip 23 may be provided for yieldably retaining the shaft in the normal position in which the pans 21 will be disposed uprightly as illustrated in Figures 2 and 3 of the drawing. Suitable apertures 24 are provided in the partition walls 13 so as to permit rotary movement of the shaft 15 and the parts carried thereby.

It is of course to be understood that the details of structure and arrangement of parts may be variously changed and modified without departing from the spirit and scope of my invention.

I claim:

1. An animal feeder comprising a longitudinal hollow body and having a feeder opening along one side, end closures on said body one thereof having a slide opening therein, partition means dividing said body into a plurality of individual feeder compartments, a slide member mountable and withdrawable through said end closure opening and having a feed receptacle thereon associated with each compartment, and means for moving the slide to dump feed received in said receptacles into the individual compartments.

2. An animal feeder comprising a longitudinal hollow body and having a feeder opening along one side, end closures on said body one thereof having a slide opening therein, partition means dividing said body into a plurality of individual feeder compartments, a slide member mountable and withdrawable through said end closure opening and having a feed receptacle thereon associated with each compartment, a rotary shaft having a slide guide thereon for slidably mounting said slide, and a crank for rotating the shaft to dump feed received in said receptacles into the individual compartments.

3. An animal feeder comprising a longitudinal hollow body and having a feeder opening along one side, end closures on said body one thereof having a slide opening therein, partition means dividing said body into a plurality of individual feeder compartments, a slide member mountable and withdrawable through said end closure opening and having a feed receptacle thereon associated with each compartment, a rotary shaft having a slide guide thereon for slidably mounting said slide, a crank for rotating the shaft to dump feed received in said receptacles into the individual compartments, and means for yieldably holding the crank against movement with the receptacles in upright position.

LEWIS BROWN.